Feb. 6, 1962 O. D. JACOBSON 3,019,822

AUTOMATIC WIRING APPARATUS

Filed Aug. 3, 1956 7 Sheets-Sheet 1

INVENTOR
O. D. JACOBSON
BY John C. Morris
ATTORNEY

INVENTOR
O. D. JACOBSON
BY John C. Morris
ATTORNEY

AUTOMATIC WIRING APPARATUS

Filed Aug. 3, 1956 7 Sheets-Sheet 3

INVENTOR
O. D. JACOBSON
BY John C. Morris
ATTORNEY

Feb. 6, 1962 O. D. JACOBSON 3,019,822

AUTOMATIC WIRING APPARATUS

Filed Aug. 3, 1956 7 Sheets-Sheet 4

INVENTOR
O. D. JACOBSON
BY John C. Morris
ATTORNEY

Feb. 6, 1962 O. D. JACOBSON 3,019,822

AUTOMATIC WIRING APPARATUS

Filed Aug. 3, 1956 7 Sheets-Sheet 5

INVENTOR
O. D. JACOBSON
BY John C. Morris
ATTORNEY

Feb. 6, 1962 O. D. JACOBSON 3,019,822

AUTOMATIC WIRING APPARATUS

Filed Aug. 3, 1956 7 Sheets-Sheet 6

INVENTOR
O. D. JACOBSON
BY John C. Morris
ATTORNEY

INVENTOR
O. D. JACOBSON
BY John C. Morris
ATTORNEY

3,019,822
AUTOMATIC WIRING APPARATUS

Oscar D. Jacobson, New York, N.Y., assignor to Bell Telephone Laboratories, Incorporated, New York, N.Y., a corporation of New York Filed Aug. 3, 1956, Ser. No. 601,996
1 Claim. (Cl. 140—71)

This invention relates to wiring systems and more particularly to improvements in controlled machinery for connecting wires between terminals of an array of electrical apparatus units.

Systems of a generally similar type are disclosed in the application of T. L. Dimond, Serial No. 370,148 filed July 24, 1953, now Patent No. 2,862,671, and R. F. Mallina, Serial No. 370,147 filed July 24, 1953, now Patent No. 2,862,670, and Serial No. 401,505 filed December 31, 1953, now Patent No. 2,905,400.

Generally, the improvements sought in the field of controlled wiring devices relate to increasing the speed with which connections are accomplished and enhancing the reliability of operation. Such improvements generally involve the number of wire wrapping spindles, the number, location, and type of wire feeding devices, the number, location, and type of wire guiding or dressing members, and the relative movements of which the foregoing elements are capable by virtue of the particular mounting and positioning arrangements employed.

Broadly, therefore, an object of this invention is an improved wiring machine.

A specific object is a machine capable of accomplishing a series of wired connections more rapidly.

Ancillary to this objective is a wiring machine capable of accomplishing all necessary wiring configurations by movement of the wire wrapping heads alone.

A further objective is a wiring machine capable of making successive interconnections without the necessity of moving both wire wrapping heads to a uniform starting or home position.

Another object of this invention is a wiring machine for interconnecting adjacent apparatus terminals simultaneously.

A particular embodiment of the invention is illustrated in the accompanying drawing, in which:

FIGS. 1, 2, 3, and 4 are schematic representations of the mode of operation of the machine of this invention;

Figure 2:
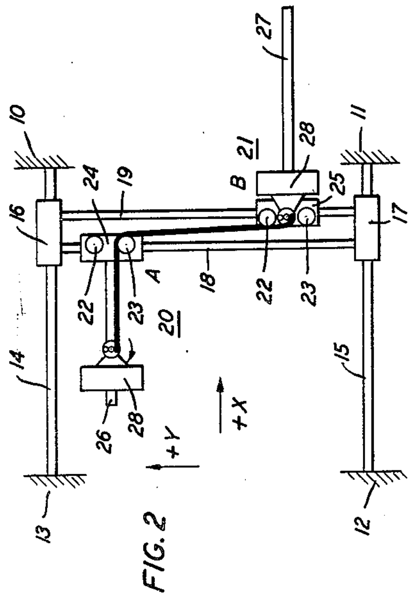
Figure 4:
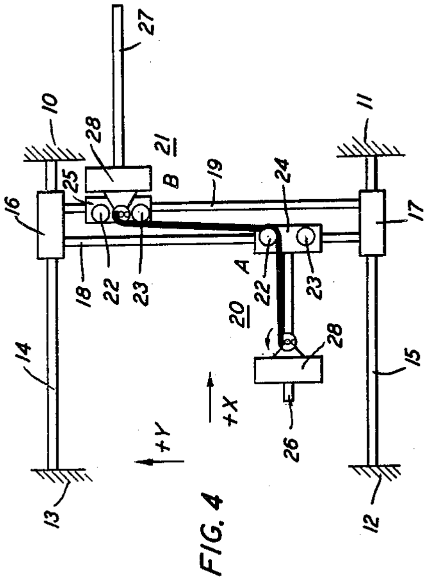

It is believed that a more complete comprehension of the wiring system of this invention will be had when considered in conjunction with a generalized discussion of the wiring systems of the above-noted disclosures.

In the noted application, Serial No. 370,148 of T. L. Dimond, a single wiring tool or gun having a wiring supply associated therewith, is moved in a coordinate system first to one terminal to make an initial connection and then to another terminal to make a final connection. The gun then is moved to still another terminal for an initial connection and so on until the panel is wired.

In the first noted application of R. F. Mallina, Serial No. 370,147, there is disclosed a wiring system in which two wiring guns move in a coordinate system over the face of a panel to be wired in accordance with a wiring scheme. The guns are loaded with wire at a home position and then are moved to the respective terminals to be interconnected, are applied each to its terminal and connect the opposite ends of the wire to the terminals. The wire is fed from a storage element which accompanies one of the guns. The guns move over prescribed paths so as to lay the wire in accordance with a predetermined pattern. Dressing pins on the panel and also accompanying the guns aid in positioning the wire as required. After each interconnection the guns return to a home position for reloading with wire and continue to make interconnections as required.

The machine of these two previously disclosed systems, with proper planning of the wiring scheme, can interconnect any two terminals of an array with the wire laid over any one of several prescribed paths. The wiring guns of each of these systems are capable of moving in an X—Y coordinate system either to the right (+X), the left (—X), up (+Y), or down (—Y) during the wire laying operations.

In the second noted application of R. F. Mallina, Serial No. 401,505, one wiring gun remains stationary while the other moves. In order to position a designated terminal at the fixed gun, movement of the panel in X—Y coordinates is employed. The other gun is limited in its movement from a home position adjacent the fixed gun to motion in one direction and in one sense or such a motion followed by a motion at right angles to the direction of the first motion and in one sense only, e.g. (+X) alone or (+X) followed by (+Y). Means are provided for rotating the panel in the wiring plane to any one of four positions 90 degrees apart, thereby enabling the making of straight or inverted L-shaped wiring in four orientations. A straight run of wire follows the path of the moving gun but a run with a right angle bend therein does not, the configuration being determined by the cooperative action of the wiring guns and a dressing finger which moves only in the (+Y) direction from a position next to the fixed gun. Thus, when the moving gun moves vertically the finger will pass the fixed gun and move upwardly, carrying with it a loop of wire which is gripped at one end by the moving gun and is being pulled through the fixed gun. The wire is thus laid in an inverted L-shaped pattern.

In the wiring machine in accordance with this invention two wiring guns are provided both of which may move in any direction and limited only in that they cannot move past each other in the X direction. In addition, both guns accept wire on either the top or the bottom of the spindle and associated with each gun is a wire storage and feed element. Each wire storage and feed mechanism has a double wire feed for selectively supplying wire to the top or bottom of the gun remote from the wire feed. Thus, each wiring operation, consisting of the interconnection of a pair of terminals, begins with the two guns positioned side by side. Wire is fed from top or bottom of either feed element depending on the configuration of the particular wiring run to be accomplished as will be explained more fully hereinafter. The gun remote from the feed element then closes to grip the wire and the guns are prepared to move to their respective wrapping locations.

Four wire dressing fingers of a novel type are included in the machine of this invention. These fingers are arranged in pairs, modularly spaced, one above and one below each wiring gun to form a dressing finger element. This spacing and directional relationship between the dressing fingers of each pair is fixed, each pair of fingers, however, being capable of movement as a unit in the Y direction, up or down, with its own associated gun.

Thus, a feature of the wiring machine of this invention resides in the two wrapping guns capable of accepting wire on either top or bottom and of moving in the X and Y directions simultanously. As a result of this capacity to accept wire on top or bottom, means are provided for rotating the wrapping guns in either direction, selectively, as a function of the mode of loading. As a consequence of these features wiring runs of upright, inverted, normal or reverse L-shaped configuration may be accomplished without rotating the panel element being wired.

Further features reside in the arrangement of dressing finger elements associated with each gun and adapted for motion in the Y direction therewith.

Another feature of this invention is a tubular, roller type dressing finger enabling the fabrication of wiring runs without abrasion of the wire covering.

Still another feature resides in the slight angle at which the axes of the wrapping spindles are disposed and the spindle body taper which enables simultaneous wrapping of horizontally adjacent terminal members.

A better understanding of the mode of operation of the machine of this invention may be had from a consideration of the schematic views of FIGS. 1, 2, 3 and 4 which depict the configurations of wiring runs attainable without rotation of the wiring panel. The wiring panels used with this invention comprise generally, a board of insulating material having a number of electrical components mounted on one side thereof and having an array of modularly spaced pin-type terminals mounted upon the opposite side. For example, such pin-type terminals may have a substantially square cross section of 45 by 45 mils, a length of .50" and a center to center spacing of .25". In explanation of these schematic representations the points 10, 11, 12, and 13 indicate fixed bases. The rods 14 and 15 are the upper and lower guides respectively for the horizontal crossheads 16 and 17 which move transversely thereon. Supported from and between the horizontal crossheads 16 and 17 are vertical guides 18 and 19.

For purposes of orientation and ease of description the left-hand gun is designated the A gun and the right-hand as the B gun (as viewed from the wiring panel and looking into the wiring apparatus). Also, as indicated by the small arrows in each figure, horizontal motion to the right is in the +X direction and to the left in the −X direction. For vertical motion, upward is +Y and downward −Y. A third degree of motion, not shown in FIGS. 1–4, accomplished by the wiring assemblies consists of a movement of the wrapping spindles and dressing fingers toward the wiring panel, designated +Z, and away from the panel, designated −Z.

Each of the vertical guides 18 and 19 carries vertical sleeve members 24 and 25, respectively. Mounted from each vertical sleeve member (24, 25) are dressing fingers 22 and 23 and horizontal guides 26 and 27 for carrying the wiring assemblies 28. In summary, the entire wiring assembly moves in the X direction upon the horizontal guides 14 and 15. The right- and left-hand vertical crossheads 24 and 25 move independently in the vertical direction on the guides 18 and 19 and the feed and wrapping heads 28 move independently on the horizontal guides 26 and 27.

Figure 1:
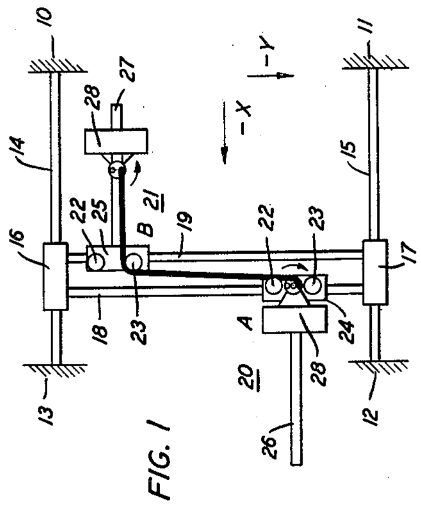

FIG. 1 depicts the making of an inverted L-shaped wiring run in which the initial position of the right- and left-hand assemblies may be taken as being side-by-side at any position in the vertical line between the location shown for the right- and left-hand wire dressing assemblies. With the two assemblies side-by-side the wire is fed from the lower side of the A assembly to a prescribed length, as will be explained more fully hereinafter. The B wrapping spindle then closes to grip the wire. The assemblies then move to their respective terminal locations upon which the wrapped connection will be made. As shown in FIG. 1, this motion consists of a +Y motion by the B assembly and a −Y motion by the A assembly, coupled with a +X motion by the B wrapping gun. During this relative motion the wire is further drawn out of the A feed member and over the lower B dressing finger 23. Upon completion of these locating motions the wire cutter of the A assembly cuts the wire, the A gun grips and the wrapping guns and dressing fingers move forward in a +Z motion which positions the wire wrapping spindles and the dressing fingers over the terminal members of the wiring panel. The wrapping spindles then rotate to accomplish the stripping and wrapping of the wire upon the two terminals, the A gun turning clockwise and the B gun counter-clockwise, as seen from the wiring panel. In a similar fashion and sequence, FIG. 2 illustrates the making of an inverted and reverted L configuration, FIG. 3 a normal L-shaped run, and FIG. 4 a reverted L-shaped run.

The individual steps involved in accomplishing these wire wrapped interconnections will be described in greater detail hereinafter, but for purposes of general illustration it will be noted from the description given in connection with these four figures that complete flexibility of wiring run configuration is attainable with the arrangement of this invention without the necessity of moving or rotating the wiring panel.

Figure 5:
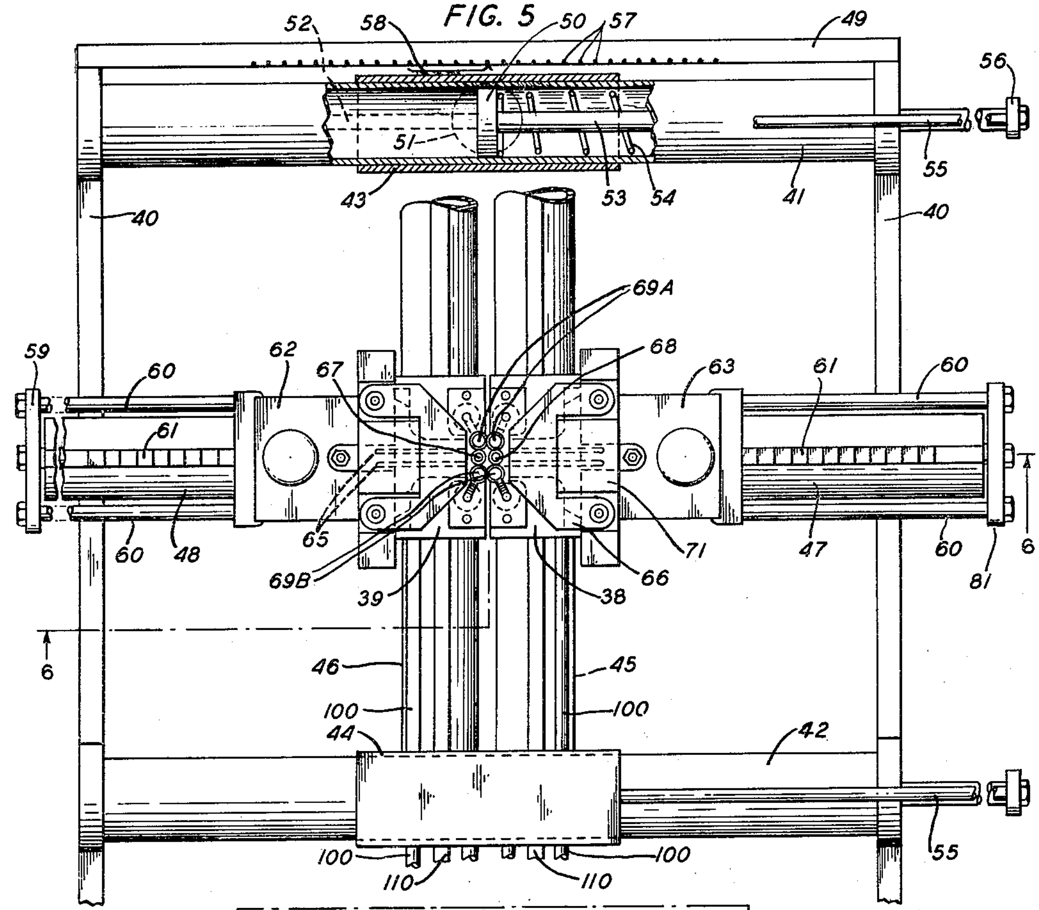
FIG. 5 is an elevation partially in section of the wiring machine viewed from the wiring panel.
Figure 6:
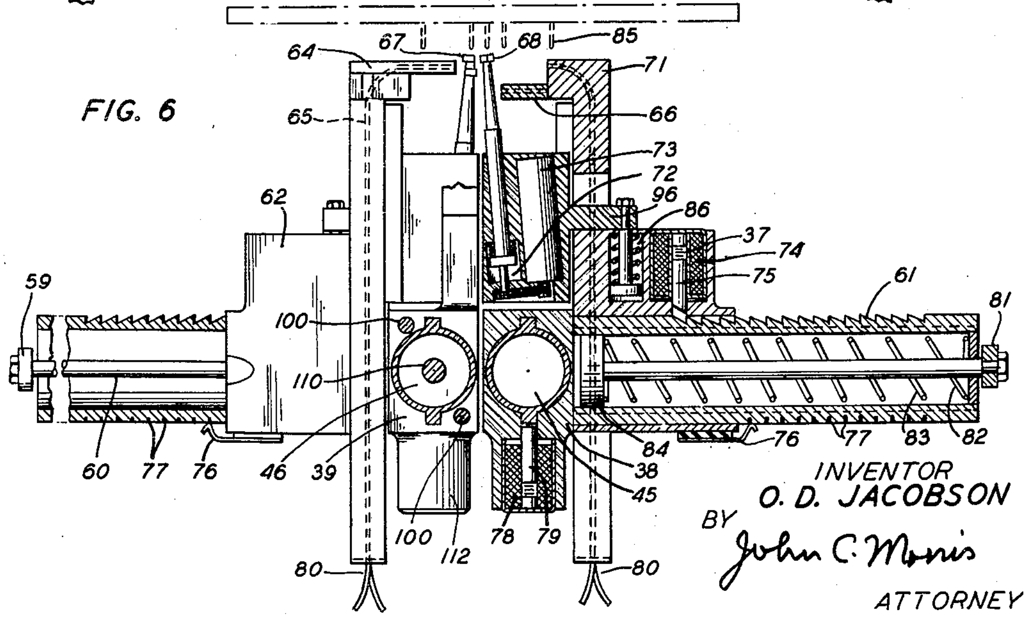
FIG. 6 is a view partially in section taken along the line 6—6 of FIG. 5 showing the wiring panel in dotted outline.
Figure 9:
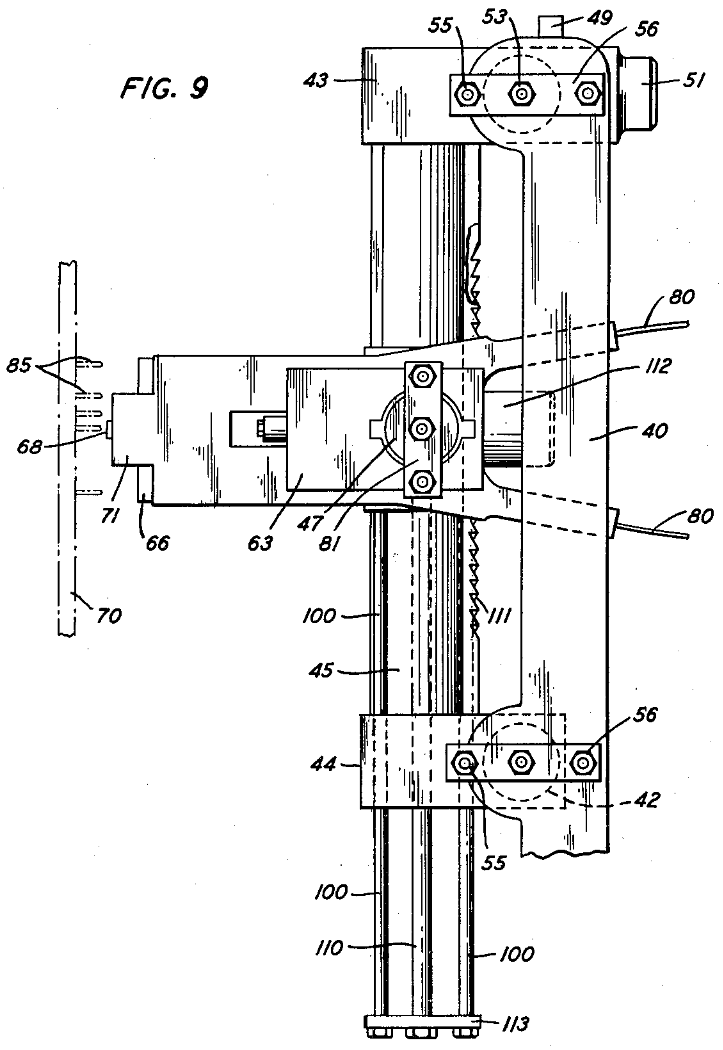
FIG. 9 is a side elevation of the wiring machine.

A general understanding of the functioning of the apparatus of this invention may be had from the following description taken in connection, particularly, with FIGS. 5, 6, and 9 in which, insofar as practicable, like mambers identifiable in the separate figures have been given the same reference character.

FIG. 5 corresponds generally to the schematic views shown in FIGS. 1 through 4, that is, the wiring machine is viewed from the wiring panel and looking into the wire wrapping heads. In order to employ a scale to permit the showing of greater detail, the assembly outline has been compacted and abbreviated in certain respects. Thus, generally all of the guide members are shown shortened or with parts broken off and omitted.

As best seen in FIGS. 5 and 9, the machine is supported from a vertical framework 40 which, in turn, may be supported from a base or fixed member in any of a number of convenient ways from above, or below or from the rear, away from the wiring panel. Fixed to the support frame are tubular members 41 and 42 which form the upper and lower horizontal guides respectively. Sliding on each of these guides are upper and lower sleeve members 43 and 44, respectively, which in turn support the tubular vertical guide members 45 and 46. Arranged for independent vertical movement on the guides 45 and 46 are the vertical sleeve members 38 and 39. Supported from each of these vertical sleeve members 38 and 39 are tubular horizontal guide members 47 and 48 upon which are mounted the sleeve members 62 and 63 which are arranged for horizontal motion thereon. The upper and lower dressing fingers 69A and 69B, respectively, are fixed to the vertical sleeve members 38 and 39, and move in the vertical direction with those members. The A assembly, comprising gun 67, wire feed 65, and cutter 64, moves to the left in a −X motion carried by the sleeve member 62 on the guide 48. Similarly, the B assembly, comprising the spindle 68, wire feed and cutter 71—66, moves with the sleeve member 63 in the +X direction on the horizontal guide 47.

Motion of these sleeve members is accomplished by a combination spring and pneumatic system, best shown by the broken away portion of the upper guide member 41. Within the cylinder 41 is a piston 50 and a spring 54. Mounted from the sleeve member 43 are connecting rods 55 on opposite sides of the cylinder and which are secured to a crosshead 56. The crosshead 56 is further connected to the piston 50 by means of the piston rod 53. The lower guide member 42 and sleeve 44 compose a similar arrangement.

The assembly is positioned in the desired location by an electromechanical system which consists of an electrical contact member 58 which rides against a set of modular, spaced commutator segments 57 on the upper frame member 49, operating in conjunction with a double rack and pawl arrangement. The rack member for the horizontal guide 41 is shown in dotted outline 52 on the left-hand portion of the broken away section of FIG. 5. A detail of a similar pawl and rack is best seen in the sectioned portion of FIG. 6. Generally, it will be understood that the spacing of the commutator segments and of the rack teeth is modular and arranged so that with the pawl in the latched position at any given rack tooth the members of the wiring head assembly, namely the wire wrapping spindle and the dressing fingers, will be in alignment with modularly spaced points on the wiring panel. As seen in FIG. 6 the pawl member 75 is lowered and withdrawn respectively by the action of a spring 37 and of a solenoid coil 74 whereby the solenoid when energized retracts the pawl, and when de-energized allows the spring member to force the pawl out and into engagement with the rack 61.

Generally the arrangement for positioning a carriage in the desired location involves the placing of ground potential on one commutator segment such that the contact member 76 will recognize this ground as a signal which will, in turn, de-energize the solenoid 74, thereby permitting the pawl 75 to drop into the appropriate tooth of the rack 61. This involves providing the necessary electrical and mechanical lead to insure the desired final locked position.

Referring to FIG. 5, in the arrangement shown in this specific embodiment, motion of a given carriage in one direction is obtained by the application of pneumatic pressure to one side of a piston and in the other direction by the action of the coil springs.

As set forth hereinbefore, the movable assemblies are positioned in the desired location by an electromechanical system comprising electrical contact members, such as the member 58, riding against a set of modularly spaced commutator segments, such as the segments 57. A consideration of the several figures of the drawing will reveal in each case that the commutator member is associated with the fixed or reference component, such as the frame 49, and the contact member is mounted on the movable member, such as the sleeve 43.

The positioning of the horizontal moving sleeve members 43 and 44 and of the vertical moving sleeve members 38 and 39 requires the provision of double racks and two-faced pawls for each guide member. With this arrangement the pawl must be withdrawn to release the sleeve for movement in either direction. Conversely, dropping the pawl into the rack stops the movement in either direction. In programming the movement of the wiring heads using the spring and pneumatic combination the condition for a particular air inlet valve will be open or closed. Upon raising the pawl from engagement with the rack the sleeve member will move in accordance with spring pressure if no air is admitted or will move under pneumatic pressure in the opposite direction if air is admitted.

In the case of the sleeve members 62 and 63 which carry the wire feed, cutting, and wrapping assemblies on the horizontal guides 47 and 48, only single racks and single faced pawls are necessary. This is because the positioning movement of the wiring heads preliminary to wrapping a terminal is always outward by means of pneumatic pressure. After the wrapped connection is made the pneumatic pressure is released and spring action returns the wiring heads to what may be termed a "home" or relative "side-by-side" position.

It should be noted that other arrangements may be used, for example by the addition of other air inlet valves, motion in both directions may be obtained by the application of air pressure. Such a scheme would also require balancing springs on both sides of the piston. The use of quick-acting solenoid-actuated air valves and pneumatic pressure enables a high speed movement of the wire wrapping assemblies to their desired locations. Further details with regard to such solenoid-operated air inlet valves will be set forth hereinafter in connection with other figures of the drawing.

As has been described above, the vertical guide members 45 and 46 supported from the sleeve members 43 and 44 move in the horizontal direction on the guides 41 and 42. The sleeve members 38 and 39 move independently in the vertical direction on the guides 45 and 46, however, remaining always within one module of each other in the X direction. The wiring assemblies, including the wire feed and cutters, move independently in the +X and −X directions on the slide members 47 and 48. The vertical movement of the sleeve members 38 and 39 is accomplished by an arrangement similar to that described above in connection with sleeves 43 and 44 by means of the connecting rods 100 and piston rods 110, shown projecting from the lower side of the sleeve member 44, which rods are interconnected through the crosshead 113, as best seen in FIG. 9.

Figure 11:
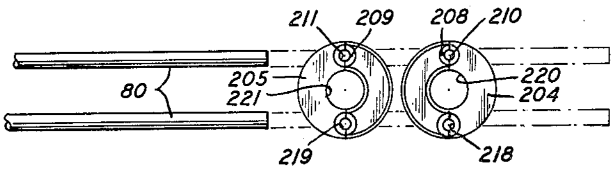
FIG. 11 is an end view of the wrapping spindle heads.
Figure 10:
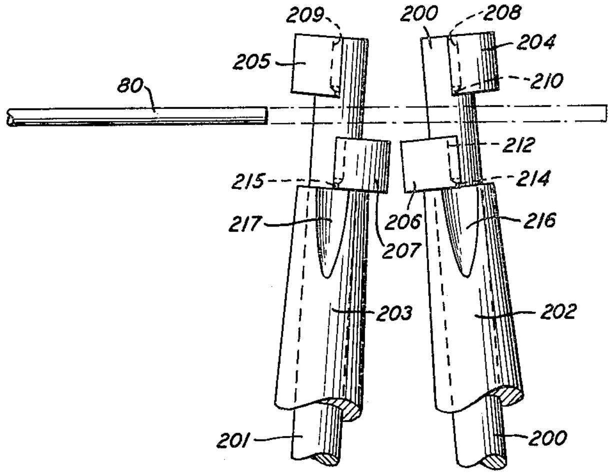
FIG. 10 is a top view partially in section of the head ends of the wrapping spindles.

Generally, as shown in FIGS. 6 and 9, four wire supplies are provided into the wire feeding and cutting assemblies. While not shown, the wire supply 80 may be taken from suitably mounted storage reels associated with the wiring machine. In FIG. 6 it will be seen that the wire 80 is fed through the bore 65, shown in dotted outline, to a position adjacent the wire wrapping spindles. As will be more fully described hereinafter, the wrapping spindles 67 and 68 and dressing fingers 69A and 69B partake of a motion in the Z direction which enables their positioning over the terminal members 85 mounted on the wiring panel 70. It may be observed in FIG. 6 that the spindles 67 and 68 are tapered and are mounted with their axes at a slight angle from the perpendicular to the wiring panel. This arrangement affords sufficient clearance to accommodate the "tail" or end of the wire between the spindles and thereby enables the simultaneous wrapping of adjacent modularly spaced terminal members. This feature is best shown in FIGS. 10 and 11 which show details of the wire stripping and wrapping ends of the spindles 67 and 68.

The wrapping guns of this invention utilize certain operational features and structures of the wire wrapping tool disclosed in the application of F. Reck, Serial No. 388,082 filed October 26, 1953, now Patent No. 2,765,-684. As shown in FIG. 10, each wrapping spindle consists of an inner shaft 200 and an outer shaft 202 arranged, by means of a keyway, to rotate with and slide longitudinally upon the inner shaft.

Figures 7, 8:
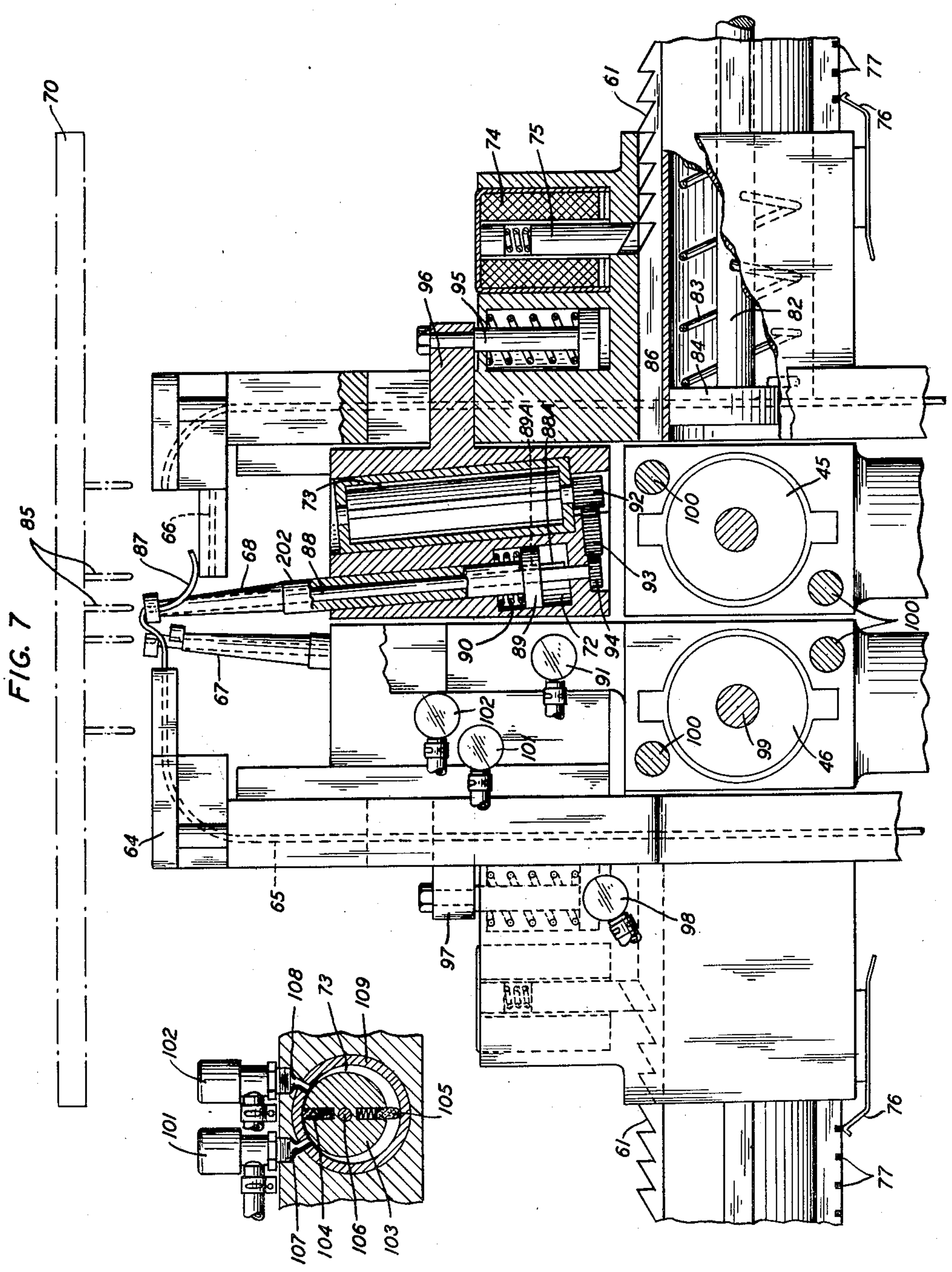
FIG. 7 is a partial view of FIG. 6 and to a larger scale to show the wire wrapping mechanism in greater detail.
FIG. 8 is a detail of one form of wrapping spindle drive motor.

Referring to FIG. 7, a key 88A on the inner shaft and keyway 89A in the outer shaft may be provided conveniently at the rearward end of the shafts. These wrapping spindles differ from those of the prior art in that they are arranged to accept wire on either the top or the bottom of the inner shaft and in their consequent ability to accomplish a wrapped connection by rotation in either the clockwise or counterclockwise direction. It will be observed that the two spindles represent opposites or right- and left-hand guns sometimes termed enantiamorphic. Both inner shafts 200 and 201 have at their outer end semicircular head portions 204 and 205 and the outer shafts 202 and 203 have matching opposed semicircular head portions 206 and 207. These head portions are arranged with semicircular matching notches 208 and 212 and 209 and 213 such that when the outer shaft is moved to the forward position each pair of notches produces a circular bore for accepting the wire 80. At the rearward end of each of the circular bores is a pair of semicircular knife edges, for example 210 and 214, forming a circular insulation crushing edge. Thus, for example, when the right-hand gun closes, following the wire feeding step, the outer shaft member 202 moves forward, carrying the wire 80, shown in dot-dash outline, forward and causing it to bend around with the end of the wire disposed away from the wiring panel and leaving the wire, in effect, gripped within the insulation crushing edges 210 and 214 by the gripping of the insulation at that location. After this gripping step the gun moves to the desired terminal location, following which the spindle is moved in the +Z direction to position it over the terminal. The spindle is then rotated in the proper direction, which in the case of the right-hand gun will be clockwise looking from the spindle into the wiring panel when the wire is fed on the top, and counterclockwise when the wire is fed on the bottom. It is necessary to employ different directions of rotation to insure that the wrapped connection and the wire run will have the desired tension and conformation.

Other details which may be noted in connection with the wrapping spindles are the flat portions 216 and 217 which insure that the free end of the wire will have sufficient clearance as it protrudes from the bores 214 and 215. Similar flats are likewise provided on the lower side of the spindles. From FIG. 11 it will be observed that if the wire 80 is fed from the top left, the top right notches 208 of the right-hand gun will grip the wire and the right-hand gun will accomplish the required horizontal or X motion. If the lower left wire is fed, then the bottom notches 218 of the right-hand gun will grip the wire by crushing the insulation. Conversely, if the wire is fed from the right-hand wire feed, the gripping will be accomplished by the respective bores of the left-hand gun. In each case the gripping action and the horizontal movement is accomplished by the wrapping gun remote from the wire feed.

This action of the wrapping spindles and other details in connection with the wiring operations are depicted in FIGS. 7 and 8 of the drawing. In FIG. 7 a length of wire is shown fed from the left-hand wire feed 64 across the left-hand gun 67 and gripped by the right-hand wrapping gun 68. The outer shaft 202 of the right-hand spindle terminates at its inner end in a piston 89 positioned in a cylinder 72 which enables, by admission of pneumatic pressure to the one side of the piston 89 against the coaction of a spring 90 on the other side of the piston, the longitudinal motion of the outer spindle member. Thus, in order to accomplish the gripping step, air pressure is applied to the piston 89, forcing the outer spindle 202 forward against the spring 90 and closing the head of the wrapping gun 68. Rotation of the wrapping spindle is accomplished by means of the air motor 73 which drives the wrapping gun through the gear train 92, 93, and 94.

To assure the correct initial position of the spindles preparatory to feeding wire thereto, indexing means are provided. Such indexing means may function in similar fashion to like means disclosed in Patent 2,725,198 issued to F. Reck November 29, 1955, or in the application of F. Reck noted hereinbefore. Essentially, the indexing means may comprise a two-position pawl which engages a notch or detent hole in the outer shaft 202. The pawl may be spring-biased toward the shaft and urged away from the shaft by air pressure coordinately with admission of air pressure to the motor 73. Thus, when the motor is rotating, the pawl is held in the release position by pneumatic pressure. When inlet air to the motor is cut off the spring-bias draws the pawl toward the shaft and into the detent position thereby stopping the shaft in readiness for the next wiring cycle.

One type of air motor suitable for rotating the wrapping spindles is shown in cross-sectional detail in FIG. 8. Such a motor comprises a rotor 103 eccentrically disposed on the shaft 106 within the cylinder 109. The rotor 103 is fitted with spring-biased vane members 104 and 105 which are diametrically opposed and arranged so as to be urged outwardly from the center of the rotor and into continuous engagement with the surface of the cylinder.

Inlet ports 107 and 108 are equispaced from a diameter taken along the line of greatest eccentricity. Associated with each inlet port are solenoid-operated air valves 101 and 102 which may be individually controlled to admit pneumatic pressure to the air motor. As viewed in this figure, clockwise rotation of the motor is attained by admitting air through the inlet port 108 which acts on the right-hand side of the rotor and lower vane 105, causing motion in the clockwise direction. This rotation will continue as the rotor moves around and each vane in turn is subjected to this pressure on the right-hand side of the rotor. Exhaust ports are provided in each of the solenoid-operated valves so that one valve vents while the other admits pneumatic pressure. These valves may conveniently be of the slide valve type so that in one position air pressure is applied to the rotor chamber while in the other position the rotor chamber is vented. Counterclockwise rotation is accomplished conversely by admission of air through the inlet port 107 in the same general fashion as described above. This type of air motor is a commercial type well known in the art.

The wrapping spindle and motor assemblies are moved in the +Z direction to place the spindle over a wiring terminal 85 by means of the air actuated piston and solenoid 86. Looking at the left-hand gun, air is admitted through the solenoid-actuated valve 98 which forces the piston and shaft upward, carrying the arm member 97 therewith. The assembly comprising the right-hand gun 68 and driving motor is moved in the Z direction in similar fashion by the air piston 86 and shaft 95 connected to the arm member 96. The operation of the wire dressing fingers in conjunction with the wire wrapping spindles is best explained in connection with FIGS. 16 and 17.

Figure 16:
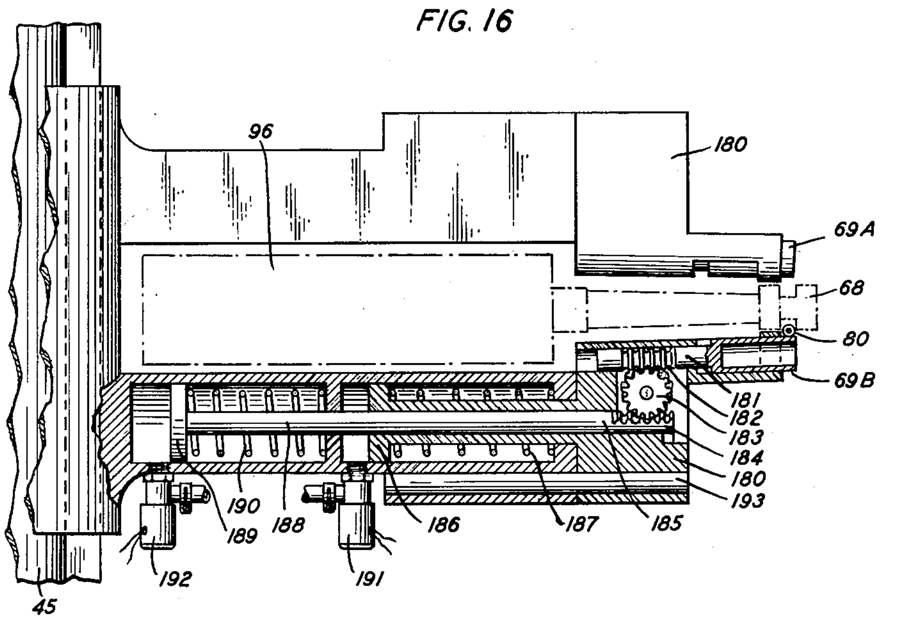
FIGS. 16 and 17 are side views partially in section of the wire wrapping mechanism showing in detail the action of the dressing fingers.

FIG. 16 is a side view, showing the wrapping spindle and dressing fingers with a wire 80 being fed over the lower dressing finger 69B, preliminary to the gripping operation of the wrapping spindle 68 shown in dot-dash outline. Attached to the wire dressing finger 69B is a shaft 181 having a rack 182 thereon which is engaged by a pinion 183, which in turn engages a rack 184 on the end of the operating shaft 185. The shaft 185 is moved by air pressure acting on the piston 189 against the pressure of the spring 190. Air is admitted to the cylinder containing the piston 189 through a conventional solenoid-actuated valve 192. Movement of the piston 189 to the left, under spring pressure, results in a clockwise rotation of the pinion 183 and movement of the dressing finger shaft 181 to the right, which forces the dressing finger 69B out of the housing 180.

Figure 17:
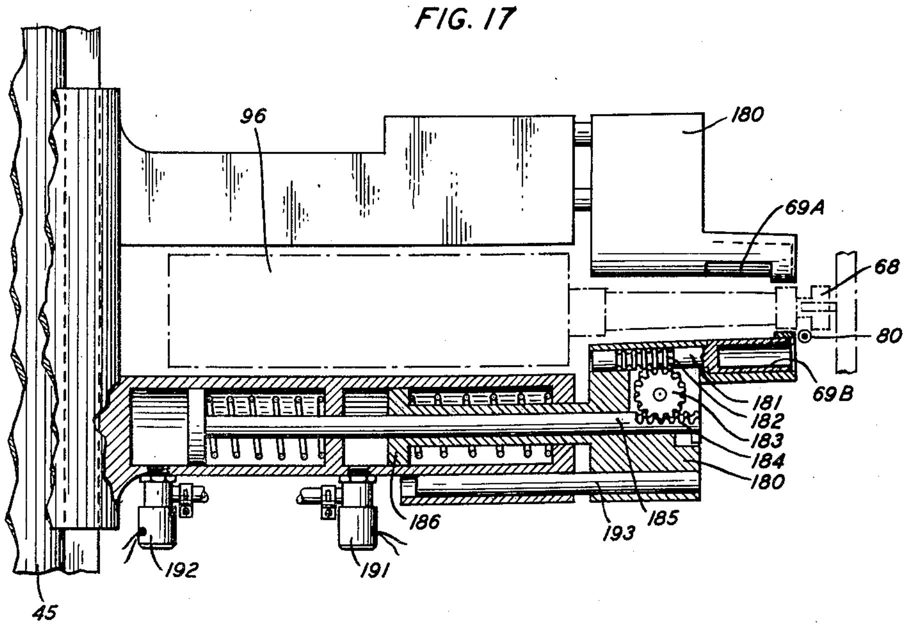

+Z motion of the dressing finger 69B, which places the finger in close relation to the wiring panel, results from the application of air pressure on the piston 186 and against the pressure of the spring 187, thereby carrying the entire housing 180 to the right and toward the wiring panel 70. The solenoid control valve 191 admits air to this cylinder. In FIG. 17, the housing member 180 is shown moved away from the base portion of the wiring assembly by a +Z motion. The guide pin 193, which may be a force fit in the housing member 180 and a sliding fit in the base member, retains the dressing finger assembly in the proper alignment.

The operation of the wire dressing fingers and the wrapping spindle head is as follows. The wire 80 is fed in on the lower side of the wrapping spindle head 68 and over the dressing finger 69B by the wire feed mechanism. In this case it is assumed that the wire is being fed toward the viewer out of the paper and is then gripped by the right-hand gun 68 of FIG. 7. Following the gripping step, the guns and associated dressing fingers 69A and 69B move to positions in alignment with their respective wrapping terminals. During this movement the wire 80 is drawn out of the wire feed mechanism and over the dressing finger 69B which may be simply a tubular member or may be a ball bearing mounted sleeve arranged to rotate with the movement of the wire. It is assumed that the gun 68 additionally moves in the −X direction toward the viewer, out of the paper, drawing the wire 80 along with it and over the dressing finger 69B. After the wire assemblies are located, the wire cutter is actuated to sever the wire to the desired length and the second gun 67 closes, gripping the wire. The wrapping guns and dressing fingers are then moved in the +Z direction, toward the wiring panel to place the wrapping spindles over the terminal to be wrapped and likewise carrying the dressing fingers into close relation to the wiring panel. In some cases the position of the dressing finger may coincide with a terminal member. As shown in FIG. 17, the dressing finger 69B is hollow, enabling entry of a terminal within a dressing finger.

The +Z motion of the dressing finger is accomplished without relative movement between the dressing finger and the housing 180. To prevent such relative movement a lug is provided on the end of the shaft 185 which engages a shoulder of the housing 180. Movement of the housing 180 to the right carries with it the shaft 185 which is prevented from movement to the left by the above-noted arrangement. Thus, as the +Z motion of the dressing finger assembly is accomplished the wire 80 remains in its relative position over the dressing finger and forward of the housing member sleeve. Following the +Z motion of the various parts toward the panel, the wire wrapping spindles rotate to accomplish the wrapped connections, following which air pressure is admitted through the valve 192 to force the piston 189 and shaft 185 to the right, thereby moving the dressing finger shaft 181 to the left and withdrawing the dressing finger 69B into the housing. This, in effect, pushes the wire 80 off of the dressing finger, leaving the wire in proper relation to the wiring panel and the other terminals. The air pressure is then removed from the Z motion pistons for the wrapping guns and dressing fingers, withdrawing the wire wrapping assemblies away from the wiring panel.

As mentioned above, wire feed and cutting mechanisms are provided on both sides of the wrapping spindles. Each of these provides two feeds, one on the upper side and one on the lower side of the wrapping spindles. Details of one of these feed mechanisms are shown in FIGS. 12 through 15.

Figure 12:
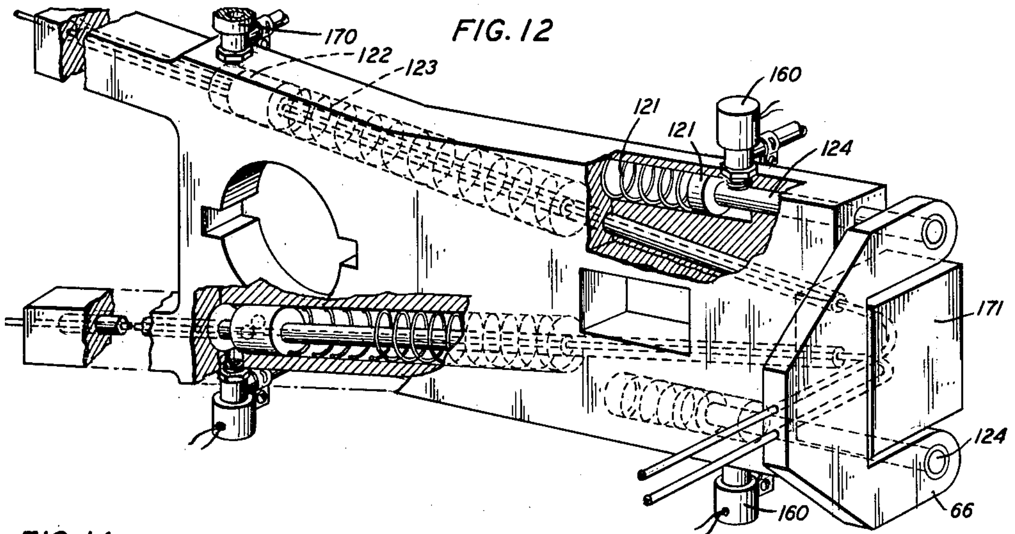
FIGS. 12 and 13 are perspectives partially in section, and with some members in phantom, of the wire feeding and cutting mechanism.
Figure 14:
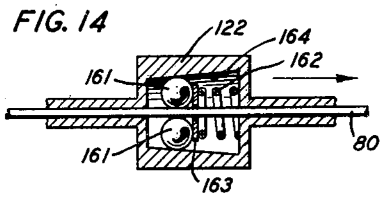
FIGS. 14 and 15 are details of the gripping mechanism of the wire feed arrangement.
Figure 15:
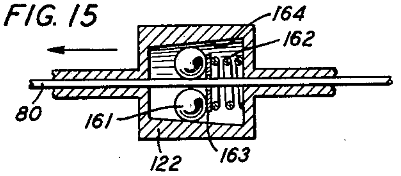

FIG. 12 shows the mechanism in the forward position with wire 80 emerging from both feeds. This wire may be fed from storage reels, not shown, through suitable bores to deliver it to the wrapping guns. The initial feeding of the wire to the wrapping guns is accomplished by applying air pressure through the valves 170 to the wire gripping pistons 122 which are forced to the right against the bias of the spring 123. The operation of the gripping pistons may be seen in detail in FIGS. 14 and 15.

The piston 122 has a frustro-conical hollow portion therein which, as seen in section, has tapering side walls 164. Within the hollow portion are three or more balls 161 which may be of steel or other suitably hard material capable of gripping the insulated wire 80. The balls are biased toward the narrower end of the hollow portion by the spring 162 and washer 163. In operation, the movement of the piston 122 to the right, as indicated by the arrow, FIG. 14, tends to make the balls 161 move toward the smaller end of the hollow portion which also tends to force the balls into closer relation with the insulated wire, thereby gripping the wire and resulting in a carrying of the wire forward with the piston 122. Thus, for each stroke of the piston 122 the wire will be carried forward an amount equal to that stroke. When the air pressure is released, the spring 123 causes the piston 122 to return to its starting position and during the return stroke the tendency of the balls 161 to move to the right, against the bias of the spring 162, will enable them to move outwardly and thereby release the wire 80. As a result, during the return stroke the wire remains stationary.

Cutting of the wire is accomplished by applying air pressure through the valves 160 against the pistons 120 which carry therewith the shaft 124 upon which the cutter head 66 is mounted. Admission of air pressure to the cutter cylinders moves the pistons 120 against the pressure springs 121, to the left, moving the plate 66 from the position shown in dotted outline of FIG. 13 to the withdrawn position shown in full lines. The face of the plate 66 is arranged in close sliding relation with the face of the member 71, enabling a shearing of the wire at this interface upon withdrawal of the member 66. It will be understood that for any given interconnecting operation only one wire is fed from one of the four feeds.

Control of the sequential operations of the wiring machine of this invention may be exercised in a number of ways. One arrangement previously disclosed in the art utilizes a punched tape for directing the various steps of the machine. A system suitable for adaptation to the wiring machine of this invention is disclosed in the above-noted application Serial No. 370,147 of R. F. Mallina. The tape reader disclosed therein is provided with twenty reading positions, but it is apparent that a greater or fewer number may be provided depending upon the amount of information to be recorded.

Figure 18:
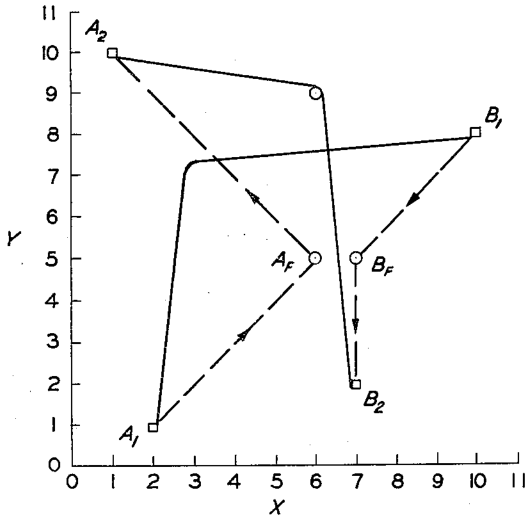
FIG. 18 is a diagram of a wiring panel including several interconnections made by the machine of this invention.

A better understanding of the operation of the wiring machine of this invention may be obtained from the following description of its step by step functions. Referring to FIG. 18, it is assumed that a wiring panel having modular dimensions of twelve units by twelve units is being wired and that the interconnection of a terminal at X–2, Y–1, designated $A_1$, and another terminal at X–10, Y–8, designated $B_1$, has just been completed. It will be assumed further that the next programmed interconnection will be between a terminal at X–1, Y–10 and X–7, Y–2, designated $A_2$ and $B_2$, respectively.

Figure 3:
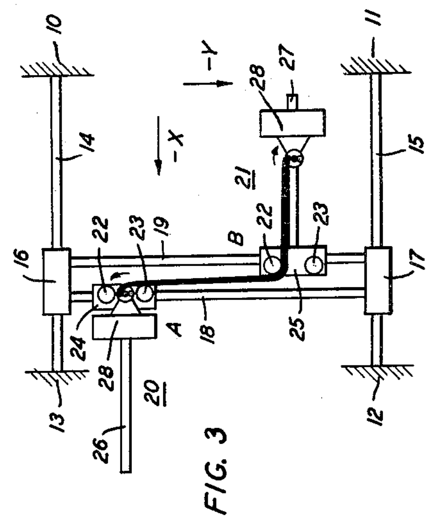

In making this next interconnection the programmer has a choice of either the configuration of FIG. 2 or FIG. 3. Upon completion of the preceding interconnection the main carriage carrying the vertical guides 18 and 19, is stationed at the X–2 and X–3 coordinates. Thus, if the configuration of FIG. 3 is selected the main carriage will move a single module to the X–1, X–2 coordinates in preparation for the next interconnection. On the other hand, a carriage movement of four modules to the right to X–6, X–7 is required preliminary to accomplishing the FIG. 2 configuration. However, it will be assumed that the programmer selects the FIG. 2 configuration in order to avoid a concentrated pile-up of wire.

Under this assumption, the punched tape directions will lift all of the latching pawls from their respective racks and simultaneously pneumatic pressure will be applied to the main carriage to drive it to the right until the X–6, X–7 position is sensed and the latching pawl drops. At the same time, the A and B guns move, respectively, right and left to their respective vertical guides. Also simultaneously, pneumatic pressure is applied to the right-hand vertical driving cylinder to send the B gun down to the Y–5 coordinate while the A gun is rising under spring pressure likewise to the Y–5 position. For each of these movements an information input is required both for directing movement and for stopping the movement. With the spring and pneumatic system the direction of movement is determined by whether pneumatic pressure is or is not applied. Stopping of movement is achieved as mentioned hereinbefore by placing a "ground" on a particular segment of a commutator so that when the segment is contacted by the moving member, the pawl solenoid is de-energized and the pawl drops to position the moving member.

In the case of the members 28 which carry the wrapping spindles, however, this particular movement requires only a release of pneumatic pressure because both spindles are driven to their innermost or "home" position on the horizontal guides 26 and 27 and locked there by the single-faced pawls.

As a result of the foregoing locating movements, the wrapping guns are positioned at $A_F$ and $B_F$ in FIG. 18. The next information input from the tape opens the pneumatic valve for the lower wire feed on the B assembly causing the feed mechanism to operate, laying a length of wire through the lower side and beyond both wrapping guns. During this feed step the cutter plate on the opposite or nonfeeding side is withdrawn to provide space on the far side of the A gun for this additional wire needed to accomplish the A connection.

In the case of all of the solenoid-actuated pneumatic valves, except for those on the horizontal guides 26 and 27 of FIGS. 1–4, and certain others which will be mentioned hereinafter, the valve opening period is fixed and the same for any and all operations and may be determined by cam operated switches driven by the tape reader drive or by timing relays. In any event, sufficient pressure is admitted to accomplish the extreme stroke or other movement of which the member is capable and the exact magnitude is determined by detents.

Following the wire feed step, the left-hand or A gun is closed by application of pneumatic pressure to the piston driving the outer shaft longitudinally. The valve admitting air to this cylinder for the gripping operation remains open until the completion of the wrapping operation at which time an information input from the tape causes the valve to close. With the wire thus gripped by the A gun the next step of the program is to direct each gun to the terminal upon which it is to make a connection.

Thus, the B gun and dressing fingers move down to locate the B gun at X–7, Y–2, denoted $B_2$. This requires tape inputs to raise the pawl, open the pneumatic valve to the vertical guide drive cylinder, and release the pawl to stop the assembly in place. The A assembly meanwhile moves up on the X–6 ordinate, stopping at the Y–10 level. In this position the upper and lower dressing fingers are located at Y–11 and Y–9, respectively, on the X–6 ordinate. At the same time the pawl for the A gun is raised, pneumatic pressure is admitted and the A gun is driven outward upon the horizontal guide 26 to the X–1, Y–10 position. During these locating movements by both gun assemblies the wire is drawn out of the B feed by the relative motion between the A gun and the B feed and is drawn around the lower dressing finger of the A assembly to produce an inverted L configuration.

Figure 13:
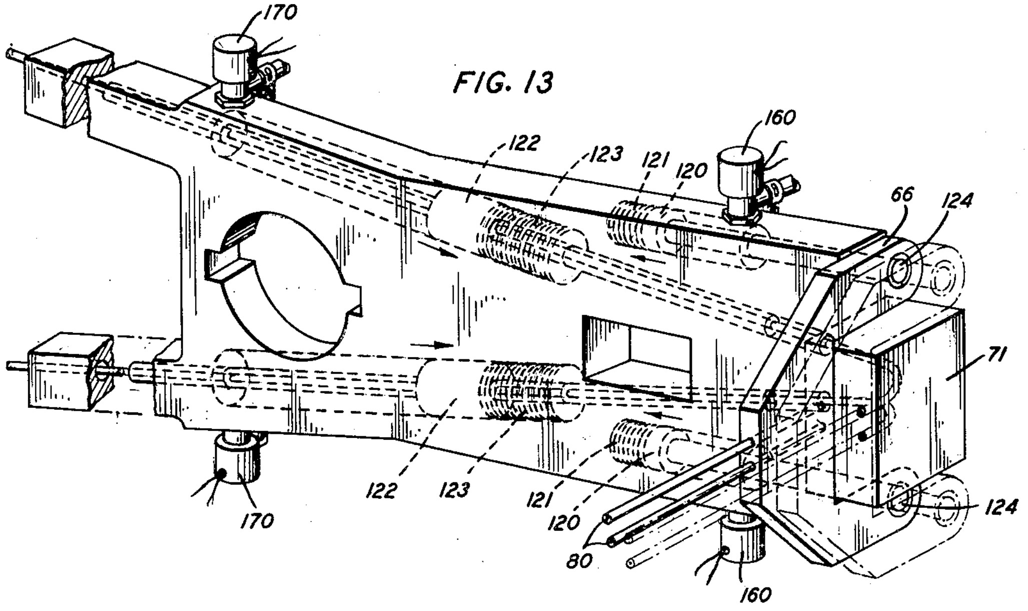

As a next step, pneumatic pressure is admitted through the valves 160, as shown in FIGS. 12 and 13, of the B cutter, thereby severing the wire preparatory to making the wrapped connections. At this juncture the B gun closes to grip the wire in the same fashion as previously described for the A gun. The next information input from the tape opens all of the valves to the Z motion cylinders for both wrapping spindles and all of the dessing fingers. These valves remain open during the wrapping operation and thereby enable the retention of the wrapping spindles and dressing fingers in position close to the wiring panel until the connections are completed.

The next step, which requires admission of pneumatic pressure to the bidirectional pneumatic motors for rotating the wrapping spindles, involves a selection of the correct valve on each of the motors to provide the desired direction of rotation. In this specific example, a consideration of FIG. 2 will indicate that to keep the proper tension in the wire around the dressing finger it is desirable to have the A gun wrap clockwise and the B gun counterclockwise. Therefore, in programming this step the information input from the tape will select the proper valve to be opened for each wrapping motor. In the case of these valves, as mentioned hereinabove, the valve opening occurs for a fixed interval sufficient to admit pressure adequate for rotating the spindles in excess of the number of revolutions actually required to make the wrapped connection. As explained in connection wtih the detailed description of the wrapping guns, the indexing means will stop the spindle rotation in the correct position preparatory to carrying out the next wrapping cycle. Upon completion of the spindle rotation, the dressing fingers are withdrawn in a −Z motion to strip the wire therefrom as described previously in connection with FIGS. 16 and 17. Next, the pneumatic valves to the Z motion cylinders are released, venting the pressure therein, thereby permitting the biasing springs in these cylinders to move the spindles and dressing fingers in the −Z direction, away from the wrapping panel. The interconnection has thus been completed and the A and B assemblies are in similar status in which they were located at the beginning of this description of the sequence of operations.

While specific embodiments of this invention have been shown and described, it will be understood that they are but illustrative and that various modifications may be made therein without departing from the spirit and scope of the invention.

What is claimed is:

In automatic wiring apparatus for applying and securing wire to moduarly spaced terminals on a planar panel, including a first and second wiring device, wire dressing means associated with each said device comprising a pair of modularly spaced tubular members one above and one below each said device, means for moving each said pair of tubular members in a plane parallel to the plane of said panel in the Y direction, means for moving each said wiring device in the X direction and in only one sense away from the position between said associated pair of tubular members, each said tubular member comprising an inner and an outer cylinder, said inner cylinder being arranged for longitudinal motion relative to said outer cylinder.

References Cited in the file of this patent

UNITED STATES PATENTS

| | | |
|---|---|---|
| 1,632,075 | Housekeeper | June 14, 1927 |
| 1,677,133 | Ford | July 17, 1928 |
| 1,823,680 | Curtiss | Sept. 15, 1931 |
| 2,035,658 | Lewis | Mar. 31, 1936 |
| 2,551,358 | Andren | May 1, 1951 |
| 2,627,379 | Moore | Feb. 3, 1953 |
| 2,637,096 | Luhn | May 5, 1953 |
| 2,743,502 | Reck | May 1, 1956 |
| 2,862,670 | Mallina | Dec. 2, 1958 |
| 2,905,400 | Mallina | Sept. 22, 1959 |